Figure 1:
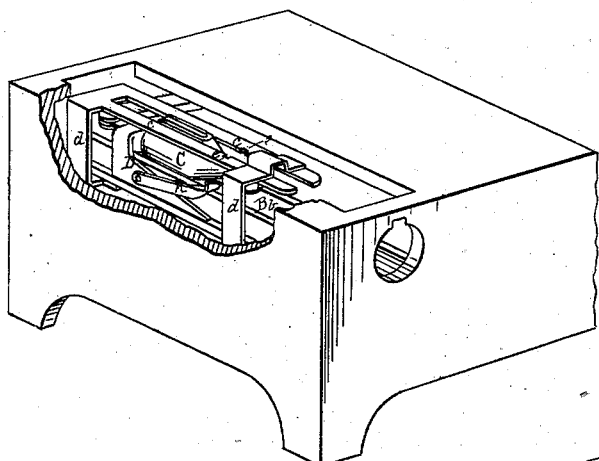

D. H. CAMPBELL.
Sewing Machine.

No. 241,612.

2 Sheets—Sheet 1.

Patented May 17, 1881.

Witnesses:
Philip F. Larner
Howell Bartte

Inventor:
Duncan H. Campbell
By Wm A. Wood
Attorney

D. H. CAMPBELL.
Sewing Machine.

No. 241,612.

2 Sheets—Sheet 2.

Patented May 17, 1881.

WITNESSES

INVENTOR
Duncan H Campbell

By his Attorney

UNITED STATES PATENT OFFICE.

DUNCAN H. CAMPBELL, OF PAWTUCKET, RHODE ISLAND, ASSIGNOR OF THREE-FOURTHS TO HENRY B. METCALF, FRANK E. COMEY, AND DANIEL McNIVEN, ALL OF SAME PLACE.

SEWING-MACHINE.

SPECIFICATION forming part of Letters Patent No. 241,612, dated May 17, 1881.

Application filed May 14, 1879.

*To all whom it may concern:*

Be it known that I, DUNCAN H. CAMPBELL, of Pawtucket, in the county of Providence and State of Rhode Island, have invented certain new and useful Improvements in Sewing-Machines; and I do hereby declare that the following specification, taken in connection with the drawings furnished and forming a part thereof, is a clear, true, and complete description of my invention.

My said improvements relate to the shuttle, its race, and its driver in certain combinations with a hook-needle, and they are particularly applicable to wax-thread machines.

Prior to my present invention I had devised many improvements, as shown and described in certain applications for Letters Patent filed by me January 30, 1878, and May 13 and 14, 1879, in machines employing what I have heretofore termed a "centrally-pointed shuttle"— that is to say, one which, when in working position, has its point in line with the axis of the shuttle and in the plane occupied by the path of the needle used therewith, in contradistinction to that large class of shuttles which co-operate with eye-pointed needles, are flattened on one side, and have their points extended to the flattened side, and are wholly to the one side of the path of the needle. In all of said machines my shuttles were provided with longitudinal webs on the under side thereof, which in each instance were so constructed as to operate as a cast-off for relieving the needle of its loop, and in several instances said web constituted also a means whereby a shuttle could be properly mounted and retained upon a central shuttle-rail.

It is obvious that webs of any kind, if located on the sides or bottom of a shuttle, require the loop to be spread or extended to a greater or lesser extent, corresponding to the increase in exterior width or depth of a shuttle due to the presence of the webs, and that the length of thread required to afford a loop of requisite dimensions for the passage of the shuttle will vary in proportion to the lateral and vertical exterior dimensions of the shuttle, and also that the extent of friction on the thread in the drawing of the loop downward and upward and in the passage of the shuttle through the loop varies in proportion to the size of the shuttle-loop.

It is also obvious that, while the size of the loop should be reduced to a minimum, the interior or thread-carrying capacity of the shuttle should be as great as is consistent with the largest loop which can be practically afforded without undue chafing of the thread in drawing it downward and upward.

In order to meet these several conditions I have devised a centrally-pointed shuttle which has no such webs or recesses as have heretofore been deemed necessary by myself and others, either as a means for casting off the loop or for mounting the shuttle on ways or splines or on a central rail; and my invention partially consists in the combination of a concave shuttle-race broken away centrally to afford a path for a needle, a hook-needle having a path centrally in said race, a reciprocating shuttle having a convex race-face and its point coincident with its axis and in line with the path of the needle, and mechanism for operating the shuttle and needle.

With a shuttle possessing these characteristics many of the well-known tension devices may be employed; but by using a tension-web on the upper side of a truly cylindrical shuttle I can rely upon it to operate as a guide for preventing the shuttle from rotating. A shuttle without a tension-web which performs this double service may be prevented from rotating by constructing it slightly oval in cross-section, as hereinafter described, and shown in the drawings.

The tension-web may be constructed in various ways—as, for instance, with a central slot and pins, or it may be a thin web with side shoulders and lateral holes for the passage of the thread, and in either form it need project but little from the shuttle.

My invention further consists in the combination of a centrally-pointed shuttle having its point and axis practically coincident, and a convex race-face, top guides, which prevent the rotation of the shuttle, a concave shuttle-rail broken away centrally, and a hook-needle having its path centrally in the shuttle-race and practically in line with the axis and point of the shuttle.

With centrally-pointed shuttles as heretofore devised by me, having a web or webs which cast off the loop from the hook-needle, I have employed a stop for preventing the loop from being carried forward by the shuttle, or I have so devised shuttle-rails that one portion thereof would serve to prevent the loop from having a forward movement with the shuttle; but with the shuttle herein described no stop is required, because the needle need not release itself from the loop until the shuttle has passed entirely through it, and therefore the loop is well held against undue forward movement, not only above the shuttle by recesses in the top guides or by the work-plate, but also below the shuttle by the needle itself.

The absence of a "cast-off" web on the shuttle and the fact that the hook-needle cannot rise to cast off while the shuttle occupies the needle-path necessitate some means independent of the shuttle for freeing the loop from the needle; and to that end my invention further consists in the combination, with a hook-needle and a centrally-pointed shuttle, of a shuttle-driver provided with a cast-off for freeing the loop from the hook-needle. This combination is in no manner dependent upon whether the shuttle has webs or not, nor upon the character of the shuttle-race, nor upon the form of shuttle-rail, provided it be broken away to afford a path for the needle, nor upon how the shuttle-driver may be otherwise constructed, mounted, or driven. The cast-off on the shuttle-driver may be variously constructed; but the simplest form thereof is attained by providing an edge of metal projecting downward from the under side of the driver, adjacent to that portion thereof which engages with the heel of the shuttle, and extending nearly to the periphery of the shuttle, so that when the shuttle has passed through the loop the needle, in rising slightly, will be in the rear of the cast-off edge, which will therefore serve to free the loop from the hook.

To more particularly describe my invention I will refer to the accompanying two sheets of drawings, in which—

Figure 2:
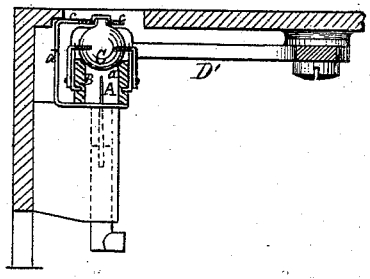
Figure 4:
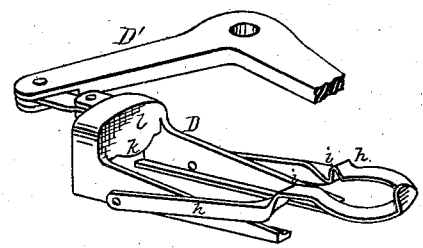
Figure 3:
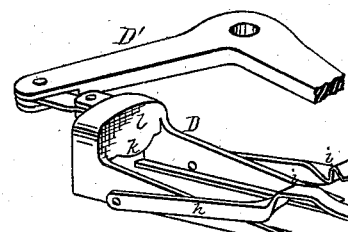
Figure 5:
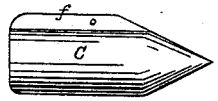
Figure 6:
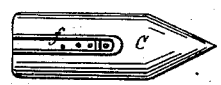
Figure 7:
Figure 8:
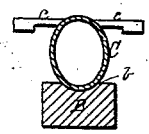
Figure 9:
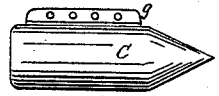
Figure 10:
Figure 11:
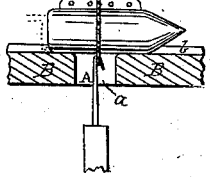
Figure 12:
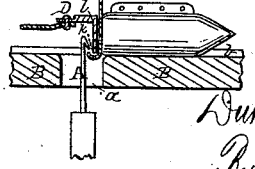
Figure 13:
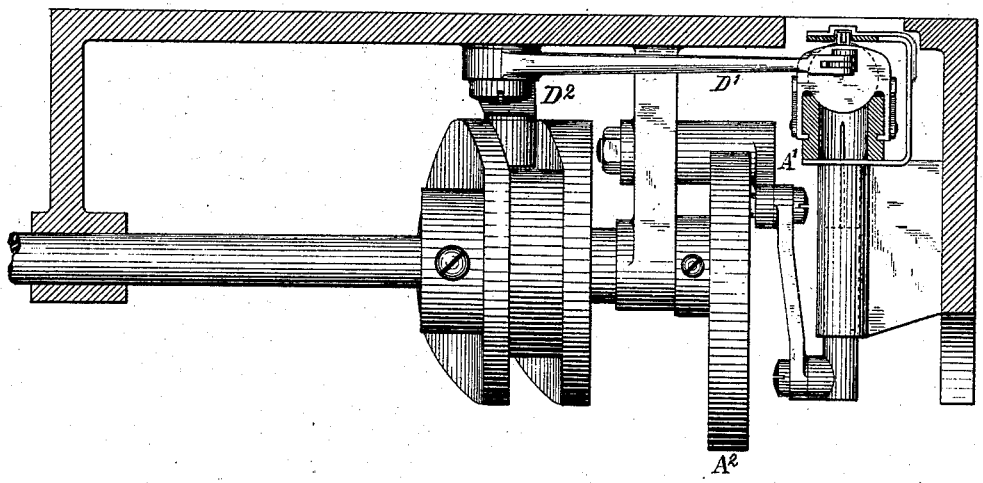

Figure 1, Sheet 1, represents the front portion of the bed of a sewing-machine embodying my improvements, with a portion of the frame broken away to show the interior parts. Fig. 2 represents the same in central vertical section. Fig. 3 represents the shuttle-rail and retaining-guides detached. Fig. 4 represents the shuttle-driver detached. Figs. 5, 6, and 7 represent the shuttle respectively in side view, top view, and lateral section. Fig. 8 represents, in cross-section, a webless oval shuttle with a convex race-face, a concave rail, and top guides, which confine it to the rail and also prevent its rotation. Figs. 9 and 10 show, in side view and cross-section, respectively, a shuttle with a modified form of tension-web. Figs. 11 and 12 illustrate the retention of the loop by the needle and the method of casting the loop from the needle. Fig. 13, Sheet 2, is a partial side and sectional view of a portion of a machine embodying my present improvements, and illustrates well-known mechanism suitable for operating the shuttle and needle.

The hook-needle A is, as heretofore, arranged to rise and carry a loop downward.

The shuttle-rail B is broken away centrally at $a$ to afford a path for the needle, and has a concave face, $b$, which may be channeled longitudinally, if desired, to obviate any undue accumulation of oil therein. The concave face corresponds in its curve to the convex race-face on the shuttle, and need be only of such width as will afford a good support for the shuttle, and such a depth of the concavity as will serve to hold the shuttle laterally. Above the rail, and parallel therewith, are two retaining-guides, $c$, which, as is shown and described in another application for patent filed by me May 14, 1879, (Case B,) serve to prevent the shuttle from rising on its rail while passing through a loop; but in this machine they also serve to confine the shuttle against any rotative tendency incident to the tension-draft on the shuttle-thread. These retaining-guides, in this instance, are supported by standards $d$, which are secured to one side of the shuttle-rail. Adjacent to the path of the needle these guides have recesses $e$, into which the sides of a loop may retire as it is spread by the shuttle, and which serve to confine the loop to a vertical position. I do not herein claim these guides, except so far as relates to their combination with a hook-needle, a concave rail, and a shuttle, which is thereby secured against any tendency to rotate on its rail. The coincident edges of these guides will have a contour corresponding to the contour of the surface of the shuttle at the points of contact therewith, as will be hereinafter described.

The shuttle C is adapted to be operated reciprocally, but, as shown, is unlike any ever before made by me or others, so far as I know, in that its body is truly cylindrical, has its point coincident with its axial line, and has no web or recesses for either operating as a cast-off for the hook-needle or for mounting it on its rail. I show, however, on the top of this shuttle a tension-web, $f$, in Figs. 5, 6, and 7, which is partially recessed longitudinally for the passage of the thread from the shuttle over and under bars or pins or through holes in a manner well known, and this web co-operates with the retaining-guides $c$ in holding the shuttle against axial movement on its rail. The form of this tension-web may be varied, and I show in Figs. 9 and 10 a simple fin, $g$, with lateral holes for receiving the thread in and out, and a squared shoulder at $g'$ for engagement with the edges of the retaining-guides $c$, which edges, when used with such webs as are shown, should be either plain or convex in cross-section. These guides, however, may co-operate with the concave rail to confine the shuttle axially, if the latter have no tension-web or other web of any kind, as shown in the shuttle, Fig. 8; and I show in that figure, in section, such guides with concave edges, which, when employed with a shuttle which is oval in cross-section, as shown, will confine it axially.

With the shuttle shown in Fig. 5, the point being practically in line with its axial line, it will be seen that, even if it should be moved axially, the point would still be in line with the path of the needle, and that it would therefore nevertheless truly enter the loop, but that if the shuttle be made in oval form, as shown in Fig. 8, the possible variation of the position of the point would be of sufficient consequence to warrant a guard against any rotary motion. With a shuttle thus constructed and mounted I believe that the maximum interior thread-carrying capacity can be attained, coupled with a minimum of external lateral and vertical dimensions, leaving it only to be determined to each class of work how large a wax-thread loop can be practically drawn downward and upward without undue chafing. As a shuttle thus constructed cannot co-operate with a hook-needle to cast off its loop, I provide therefor by so constructing the shuttle-driver that it may perform that function.

The shuttle-driver D is mainly constructed and mounted as heretofore by me, and as shown in other applications for Letters Patent filed May 13 and 14, 1879, (Cases A and C.) The bridle $h$, at its front end, is, however, novel, in that it is elevated, as at $i$, so that it may properly engage with the neck of the shuttle in line with its point, which is considerably above the face of the rail. The novel feature to be considered in this connection is the cast-off $k$, which in this instance is the lower edge of the plate $l$, which engages with the heel of the shuttle. As shown in Fig. 11, the hook-needle holds the loop during the passage of the shuttle, but after it has passed the needle rises at the rear of the plate $l$, so that its lower edge, constituting the cast-off $k$, will free the loop from the hook, as shown in Fig. 12.

In Fig. 13, Sheet 2, I show well-known mechanism for operating the shuttle and needle; but such can be indefinitely varied without departing from my invention. The needle is there shown to be operated by the lever $A'$ and cam $A^2$ on the main shaft, and the shuttle is reciprocated by the lever $D'$ and cam $D^2$, in a manner well known. The needle-cam has the proper lines to cause the needle, after having taken its thread, to move downward with its loop to a point just below the path of the shuttle, and then to rest until the shuttle has passed, which is followed closely by a rise of the needle, to enable the shuttle-driver to cast off the loop, after which the needle falls to its lowest position, preparatory to its next upward movement to bring down another loop after the return of the shuttle.

I have shown in another prior application for Letters Patent, filed January 30, 1878, such needle-operating mechanism having precisely the movements indicated, and varying therefrom only in the matter of time as compared with the time of the shuttle movement. It will be seen that as soon as the needle has carried the lower end of the loop opposite the point of the shuttle the latter may promptly move forward without liability of contact with the needle, because of the space afforded beneath the point between its outer extremity and the main portion or body of the shuttle.

Having thus described my invention, I claim as new and desire to secure by Letters Patent—

1. The combination, substantially as hereinbefore described, of the reciprocating shuttle having a convex race-face, and a point practically in line and coincident with its axis, a hook-needle having its path practically in line with the point and axis of the shuttle, a concave shuttle-rail broken away centrally to afford a path for the needle, and mechanism for operating the shuttle and needle.

2. The combination of the centrally-pointed shuttle having a convex race-face and its point coincident with its axis, the concave shuttle-rail broken away centrally, a hook-needle having its path centrally in the rail and practically in line with the point and axis of the shuttle, and top guides for preventing the rotation of the shuttle, substantially as described.

3. The combination, substantially as hereinbefore described, of the hook-needle, a centrally-pointed shuttle, a shuttle-driver provided with a cast-off for freeing a loop from the hook-needle, and mechanism for operating the needle and shuttle-driver.

DUNCAN H. CAMPBELL.

Witnesses:
  CHARLES E. DAVIS,
  JOS. E. JENCKES.